United States Patent [19]
Khatiblou et al.

[11] Patent Number: 5,735,626
[45] Date of Patent: Apr. 7, 1998

[54] SEPARATING RAIL ASSEMBLY

[75] Inventors: Mohsen A. Khatiblou, Laguna Hills; Hal D. Pope; James M. Schutt, both of Huntington Beach, all of Calif.

[73] Assignee: McDonnell Douglas Corp.

[21] Appl. No.: 721,270

[22] Filed: Sep. 26, 1996

[51] Int. Cl.⁶ .................................................. F16B 2/00
[52] U.S. Cl. .................. 403/16; 102/275.12; 102/378; 244/121; 244/131
[58] Field of Search ................... 403/16, 28, 179, 403/404, 393, 384; 102/275.12, 275.7, 275.2, 377, 378; 244/121, 122 AF, 131, 151 B; 89/1.811

[56] References Cited

U.S. PATENT DOCUMENTS

| | | |
|---|---|---|
| 2,690,122 | 9/1954 | Darnall, Jr. et al. . |
| 2,896,509 | 7/1959 | Musgrave . |
| 3,336,868 | 8/1967 | Rush et al. . |
| 3,362,290 | 1/1968 | Carr et al. . |
| 3,501,112 | 3/1970 | Webb ............................. 102/377 |
| 3,633,456 | 1/1972 | Carr et al. . |
| 3,698,281 | 10/1972 | Brandt et al. . |
| 4,106,875 | 8/1978 | Jewett ............................ 102/378 |
| 4,648,227 | 3/1987 | Reusch . |
| 4,685,376 | 8/1987 | Noel et al. . |
| 4,861,183 | 8/1989 | Loos ............................. 403/393 X |
| 4,879,941 | 11/1989 | Repe et al. . |
| 5,056,950 | 10/1991 | Rateick, Jr. et al. ............. 403/28 X |
| 5,109,749 | 5/1992 | Olcer ............................. 102/378 X |
| 5,129,306 | 7/1992 | Fauvel ........................... 102/378 X |
| 5,331,894 | 7/1994 | Wassell et al. .................. 102/378 X |
| 5,372,071 | 12/1994 | Richards et al. ................. 102/378 |

*Primary Examiner*—Kenneth J. Dorner
*Assistant Examiner*—William L. Miller
*Attorney, Agent, or Firm*—Donald E. Stout; Kenton R. Mullins

[57] ABSTRACT

A thrusting rail-joint assembly for joining and rapidly separating two host structures is disclosed. Each of the two host structures may include a fairing structure, and is connected to a latching member, which may include a rail segment. An outer latching member, having a first joining end and a first latching end, is secured to the first host structure at the first joining end. The outer latching member includes a number of latching arms at the first latching end. The latching arms extend from the outer latching member in a direction from the first joining end to the first latching end. An inner latching member has a second joining end and a second latching end. The inner latching member is secured to the second host structure at the second joining end, and has a number of recesses at the second latching end. The recesses are adapted to receive the latching arms when the outer latching member is latched onto the inner latching member. Latching of the outer latching member onto the inner latching member secures the first host structure to the second host structure.

22 Claims, 1 Drawing Sheet

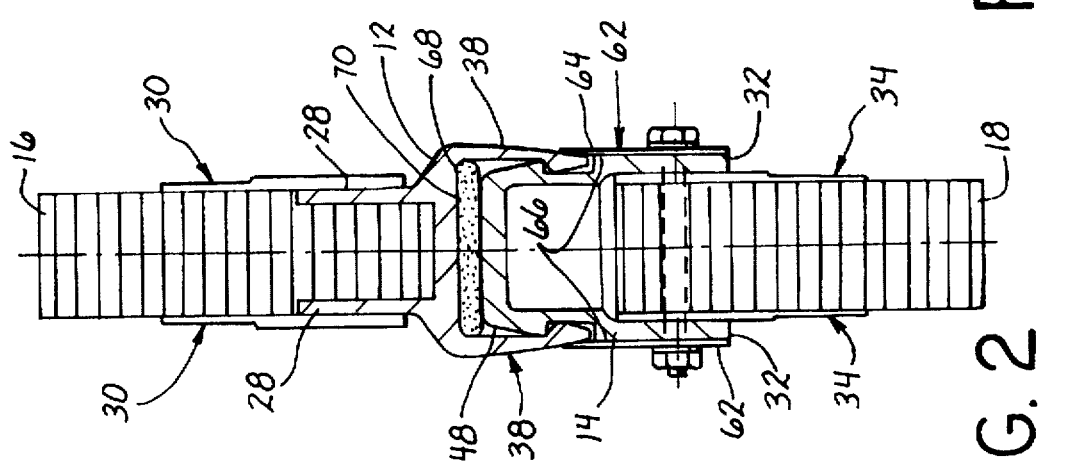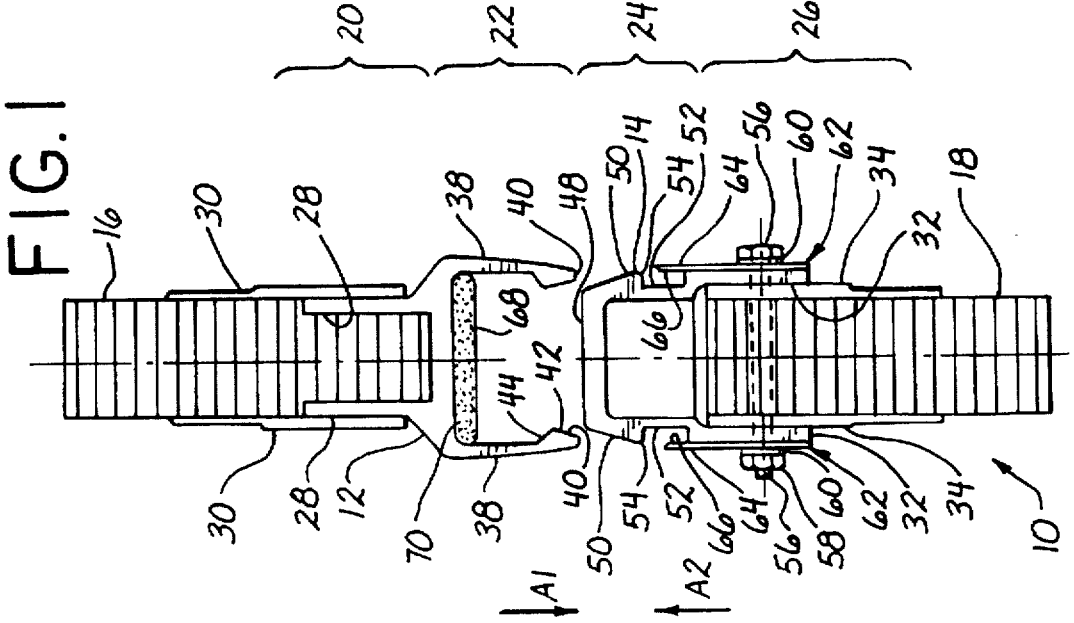

SEPARATING RAIL ASSEMBLY

BACKGROUND OF THE INVENTION

1. Field of the Invention

The present invention relates generally to a separating rail assembly and, more particularly, to a non-destructive separating rail assembly for facilitating the disposal of a fairing structure from a launch vehicle.

2. Description of Related Art

The fairing structures of a launch vehicle provide many advantages to the launch vehicle while the launch vehicle is in the atmosphere. However, the performance of the launch vehicle can be enhanced by discarding these fairing structures prior to orbit. This elimination of fairing structures reduces the weight of the launch vehicle, for example.

Many conventional launch vehicles jettison the fairing structure prior to orbit, using a thrusting rail assembly. A typical thrusting rail assembly is relatively heavy, has many component parts, is difficult to assemble and install, and has a very high cost. Existing rail assemblies can be unnecessarily heavy, often comprising a metal, such as aluminum. These rail assemblies are joined with the fairing structures using close-tolerance drilled holes, and the installation of mechanical fasteners. Typical mechanical fasteners include rivets, for example, which are broken during the jettison of the fairing structures. Additionally, the relatively large number of component parts associated with a conventional fairing structure jettison device introduces an unnecessary amount of unreliability into the system. The use of aluminum rail segments requires isolation from any graphite structure on the launch vehicle.

An aluminum fairing structure jettison device is also relatively stiff, resulting in poor distribution of loads thereon. These conventional fairing structure jettison devices are also difficult to assemble and install, in addition to being voluminous in parts. These prior art systems often suffer from high cost, and less than optimal performance. For example, although a prior art fairing structure jettison device may be tailored to accommodate different separation loads by utilizing unique rivet sizes, unique rivet materials, and variable rivet spacing, these design parameters are often cumbersome to implement. Additionally, the actual separation achieved between the rail segments is not completely nondestructive, since contamination often results from broken or dislodged rivet fragments. A separating device is needed, which is simple in structure and which is lightweight and efficient.

SUMMARY OF THE INVENTION

The separating rail assembly of the present invention includes a rail segment attached to each fairing structure. Since each rail segment is formed of a composite material, which is preferably non-metallic, the weight of the separating rail assembly is reduced. Since the rail segments are formed of a composite material, the rail segments can be integrated into the fabrication process for generating composite fairing structures. The composite rail segment can be incorporated into the shell lay-up of the fairing structure and co-cured. Thus, the need of the prior art to drill close tolerance holes, and of mechanical fasteners, is eliminated. The non-metallic rail segments of the present invention closely match the thermal expansion of the fairing structure and, accordingly, thermal stresses induced during the co-curing are reduced. Additionally, since the rail segments are not fabricated of aluminum, these rail segments do not need to be isolated from graphite structure of the launch vehicle, resulting in fewer parts and lighter weight of the overall system. Since the non-metallic rail segments are co-cured with the fairing structures, rivets are not needed for this purpose. The system can be assembled with relative ease, and is relatively inexpensive. Since the rail segments are formed of a composite material, these rail segments are relatively flexible, compared to aluminum, resulting in better distribution of loads.

An expandable separator is placed between the two rail segments. When the expandable separator is activated, it expands to thereby separate the two rail segments. The expanding separator ordnance simplifies ordnance installation and eliminates the potential of damaging bellows, typically associated with the prior art. This expanding separator assembly contains fewer parts than conventional systems and, further, may have a lower safety hazard classification than many conventional systems. Activation of the expandable separator results in a non-destructive, contamination-free, separation of the two rail segments. Additionally, various separating loads may be accommodated by changing the thickness of the doublers, which extend from one rail segment and fit over another rail segment.

According to one broad aspect of the present invention, a thrusting rail-joint assembly for joining and rapidly separating two host structures is disclosed. Each of the two host structures may include a fairing structure, and is connected to a latching member, which may include a rail segment. An outer latching member, having a first joining end and a first latching end, is secured to the first host structure at the first joining end. The outer latching member includes a number of latching arms at the first latching end. The latching arms extend from the outer latching member in a direction from the first joining end to the first latching end. An inner latching member has a second joining end and a second latching end. The inner latching member is secured to the second host structure at the second joining end, and has a number of recesses at the second latching end. The recesses are adapted to receive the latching arms when the outer latching member is latched onto the inner latching member. Latching of the outer latching member onto the inner latching member secures the first host structure to the second host structure.

The latching arms of the outer latching member, the first latching end, and the second latching end form a chamber where the outer latching member is latched onto the inner latching member. An expandable separator is disposed within this chamber. The expandable separator is adapted to expand upon activation, to thereby separate the inner latching member from the outer latching member.

The latching arms of the outer latching member fit over the second latching end of the inner latching member, and fit into the recesses at the second latching end of the inner latching member. A number of doubler elements are secured to the inner latching member. The number of doubler elements corresponds to the number of latching arms. Each doubler element extends from the inner latching member and fits over a corresponding one of the latching arms. Each doubler element thus biases a corresponding latching arm into a recess of the inner latching member. The thickness of the doubler elements can be changed to adjust the amount of separation force required by the expandable separator for thrusting the inner latching member away from the outer latching member. The doubler elements are thus removable from the inner latching member, and may be replaced after each use.

The present invention, together with additional features and advantages thereof, may best be understood by reference to the following description taken in connection with the accompanying illustrative drawings.

BRIEF DESCRIPTION OF THE DRAWINGS

FIG. 1 illustrates the thrusting rail-joint assembly in an unattached configuration, according to the presently preferred embodiment;

FIG. 2 illustrates a cross-sectional view of the thrusting rail-joint assembly in an attached configuration, according to the presently preferred embodiments; and FIG. 3 illustrates the thrusting rail-joint assembly after separation, according to the presently preferred embodiments.

DETAILED DESCRIPTION OF THE PRESENTLY PREFERRED EMBODIMENTS

Turning to FIG. 1, a separating rail assembly 10 is illustrated in a pre-attachment configuration. The separating rail assembly 10 comprises an outer rail segment 12, an inner rail segment 14, a first fairing structure 16, and a second fairing structure 18. The outer rail segment 12 comprises a first joining end 20 and a first latching end 22. The first joining end 20 comprises two joining arms 28 of the outer rail segment 12 that are secured to the first fairing structure 16. The two joining arms 28 thus secure the outer rail segment 12 to the first fairing structure 16.

In the presently preferred embodiment, both the outer rail segment 12 and the first fairing structure 16 comprise a composite material, which is preferably non-metallic. The outer rail segment 12 may thus be secured to the first fairing structure 16, via the joining arms 28, using a co-curing method. The outer rail segment 12 may be incorporated into the shell lay-up with the first fairing structure 16 and the combination co-cured. Two co-curing interface stiffeners 30 may or may not be required, depending upon the materials used in the manufacture of the outer rail segment 12 and the first fairing structure 16. In the presently preferred embodiment, the outer rail segment 12 and the first fairing structure 16 comprise well-known composite materials, and the co-curing interface stiffeners 30 are used to provide desirable strength characteristics to the co-cured joint assembly. Similarly, the second joining end 26 of the inner rail segment 14 comprises two joining arms 32, which may be co-cured with the second fairing structure 18. The co-curing interface stiffeners 34 of the inner rail segment 14 are preferably placed over the second fairing structure 18.

The first latching end 22 of the outer rail segment 18 comprises two latching arms 38. Each latching arm 38 comprises a protrusion 40 at a distal end thereof, and each protrusion 40 comprises an inner ramp surface 42 and a steep angled surface 44.

The second latching end 24 of the inner rail segment 14 comprises an outer leading surface 48, two outer ramp surfaces 50, and two recesses 52. Each recess 52 comprises a steep angled surface 54.

A bolt 56, nut 58, and two washers 60 secure two doublers 62 to the inner rail segment 14. Each of the doublers 62 comprises an outer surface 64 and an inner surface 66.

The outer rail segment 12 is brought into contact with the inner rail segment 14 by moving the first fairing structure 16 in the direction of the arrow A1 and by moving the second fairing structure 18 in the direction of the arrow A2. The inner ramp surfaces 42 of the protrusions 40 contact the outer ramp surfaces 50 of the inner rail segment 14. Both of the ramp surfaces 42, 50 are slight, to facilitate movement of the protrusions 40 over the outer ramp surfaces 50 with relatively small actuation forces. As the inner ramp surfaces 42 move up the outer ramp surfaces 50, the latching arms 38 bend slightly away from each other. Small actuation forces are applied to the first and second fairing structures 16, 18 until the steep angled surfaces 44 of the protrusions 40 contact the steep angled surfaces 54 of the recesses 52. These steep angled surfaces 44, 52 serve to lock the protrusions 40 within the recesses 52. The inner surfaces 66 of the doublers 62 contact the protrusions 40 and bias the protrusions 40 into the recesses 52. The protrusions 40 and recesses 52 are pre-sized to insure a positive engagement force sufficient to meet design requirements for the joint established between the outer rail segment 12 and the inner rail segment 14. Additionally, the doublers 62 are similarly pre-sized to insure a positive bias force disposing the latching arms 38 against the recesses 52.

In the presently preferred embodiment, an expandable separator 68 is placed on the inner surface 70 of the outer rail segment 12 before insertion of the inner rail segment 14 between the two protrusions 40. The expandable separator 68 is preferably secured to the inner surface 70 of the outer rail segment 12. The expandable separator 68 may be placed against the inner surface 70 either before or after insertion of the inner rail segment 14 between the two protrusions 40. Alternatively, the expandable separator 68 may be secured to the outer leading surface 48 or not secured at all.

FIG. 2 illustrates a cross-sectional view of the separating rail assembly 10, after the inner rail segment 14 is inserted between the two protrusions 40 of the outer rail segment 12. The expandable separator 68 snugly fits between the inner surface 70 of the outer rail segment 12 and the outer leading surface 48 of the inner rail segment 14. FIG. 3 illustrates the separating rail assembly 10 in a post activation configuration, where the outer rail segment 12 and first fairing structure 16 move in the direction of the arrow A3, relative to movement of the inner rail segment 14 and the second fairing structure 18 in the direction of the arrow A4. The expandable separator 68 preferably expands into the shape of a sphere when activated. The expansion of the expandable separator 68 into the spherical shape inparts separating forces on the inner surface 70 of the outer rail segment 12 and on the outer leading surface 48 of the inner rail segment 14.

As the steep angled surfaces 44 of the protrusions 40 move along the steep angled surfaces 54 of the recesses 52, the protrusions 40 bend away from each other. The stiffness of the doublers 62 determine whether the protrusions 40 will exit from the recesses 52. These doublers 62 may be varied in shape and thickness to accommodate different loads. In the presently preferred embodiment, the doublers 62 are bent slightly outwardly away from each other upon the exiting of the protrusions 40 from the recesses 52, but resilient doublers 62 may be used, according to design preference. The explosive charge of the expandable separator 68, the angles of the angled surfaces 44 and the steep angled surfaces 54, and the stiffness of the latching arms 38 may also be varied to accommodate different loads.

The force that causes the outer rail segment 12 and the inner rail segment 14 to separate from one another is produced by the expanding gases trapped within the expandable separator 68, after the expandable separator 68 is activated. Upon activation, the expandable separator 68 changes from a flattened tube cross-section, at installation, to a circular cross-section following tube expansion.

In addition to the above-described application of the separating railing assembly in the context of launch vehicle fairing separations, many other applications of the invention are possible. For example, the separating rail assembly may be used for satellite and spacecraft release mechanisms, aircraft canopy ejections, and munitions deployment, to name a few.

Although an exemplary embodiment of the invention has been shown and described, many other changes, modifications and substitutions, in addition to those set forth in the above paragraphs, may be made by one having ordinary skill in the art without necessarily departing from the spirit and scope of this invention.

What is claimed is:

1. A thrusting rail-joint assembly for joining and rapidly separating two host structures, the thrusting rail-joint assembly comprising:
   a first host structure;
   a second host structure;
   an outer latching member having a first joining end and a first latching end, the outer latching member being secured to the first host structure at the first joining end and having a plurality of latching arms at the first latching end, the plurality of latching arms extending from the outer latching member in a direction from the first joining end to the first latching end;
   an inner latching member having a second joining end and a second latching end, the inner latching member being secured to the second host structure at the second joining end and having a plurality of recesses at the second latching end, the plurality of recesses being adapted to receive the plurality of latching arms when the outer latching member is latched onto the inner latching member;
   a plurality of doubler elements attached to the inner latching member, the plurality of doubler elements being adapted to contact the plurality of latching arms when the outer latching member is latched onto the inner latching member; and
   an expandable separator adapted to be disposed between the outer latching member and the inner latching member, the expandable separator being adapted to expand and separate the inner latching member from the outer latching member.

2. The thrusting rail-joint assembly as recited in claim 1, the expandable separator being adapted to fit against the outer latching member, and being adapted to thrust the inner latching member away from the outer latching member.

3. The thrusting rail-joint assembly as recited in claim 2, the expandable separator being secured to an inner surface of the outer latching member, the inner surface of the outer latching member being located between the plurality of latching arms.

4. The thrusting rail-joint assembly as recited in claim 1, the plurality of doubler elements being adapted to bias the plurality of latching arms into the plurality of recesses when the outer latching member is latched onto the inner latching member.

5. The thrusting rail-joint assembly as recited in claim 4, the plurality of latching arms comprising outer arm surfaces and inner arm surfaces, the inner arm surfaces of the plurality of latching members being adapted to fit into the plurality of recesses.

6. The thrusting rail-joint assembly as recited in claim 5, the plurality of doubler elements being adapted to contact the outer arm surfaces of the plurality of latching arms and to bias the latching arms into the recesses when the outer latching member is latched onto the inner latching member.

7. The thrusting rail-joint assembly as recited in claim 1, the plurality of latching arms comprising two latching arms, the plurality of recesses comprising two recesses, and the plurality of doubler elements comprising two doubler elements.

8. The thrusting rail-joint assembly as recited in claim 7, the two latching arms being flexible.

9. The thrusting rail-joint assembly as recited in claim 1, the plurality of doubler elements being removable and replaceable after each use.

10. The thrusting rail-joint assembly as recited in claim 1, at least one of the outer latching member and the inner latching member comprising a composite material.

11. The thrusting rail-joint assembly as recited in claim 1, the first host structure being joined to the first joining end of the outer latching member by co-curing without fasteners, and
   the second host structure being joined to the second joining end of the inner latching member by co-curing, without fasteners.

12. The thrusting rail-joint assembly as recited in claim 1, a deflection characteristic of each of the plurality of doublers being controllable.

13. The thrusting rail-joint assembly as recited in claim 12, a deflection characteristic of each of the plurality of doublers being controllable by selection of at least one of a material and a thickness of the doubler.

14. The thrusting rail-joint assembly as recited in claim 1, the expandable separator comprising a balloon.

15. The thrusting rail-joint assembly as recited in claim 14, the separating of the inner latching member from the outer latching member being non-destructive, wherein the expandable separator can be deflated and reused.

16. A thrusting rail-joint assembly for joining and rapidly separating a plurality of host structures, the thrusting rail-joint assembly comprising:
   a first host structure;
   a second host structure;
   an outer latching member extending from the first host structure, the outer latching member having at least two latching arms extending from an inner surface of the outer latching member;
   an inner latching member extending from the second host structure, the inner latching member having at least two recesses disposed on a latching end of the inner latching member, the at least two recesses being adapted to receive the at least two latching arms to thereby form a chamber, which is defined between the at least two latching arms, the inner surface, and the latching end;
   biasing members attached to the inner latching member for biasing the at least two latching arms toward said inner latching member; and
   an expandable separator adapted to be disposed within the chamber, the expandable separator being adapted to expand and separate the inner latching member from the outer latching member.

17. The thrusting rail-joint assembly as recited in claim 16, the expandable separator being adapted for forcing the inner latching member outwardly away from the outer latching member, to thereby separate the first host structure from the second host structure.

18. The thrusting rail-joint assembly as recited in claim 16, the outer latching member being U-shaped.

19. The thrusting rail-joint assembly as recited in claim 16, each of the two latching arms being flexible.

20. The thrusting rail-joint assembly as recited in claim 19, each of the two latching arms having an outer arm surface and an inner arm surface, the inner arm surface of at least one of the two latching arms opposing the inner arm surface of another of the two latching arms.

21. The thrusting rail-joint assembly as recited in claim 16, the first host structure being joined to the outer latching member by co-curing without fasteners, and the second host structure being joined to the inner latching member by co-curing without fasteners.

22. A thrusting rail-joint assembly for joining and rapidly separating a first host structure and a second host structure, the thrusting rail-joint assembly comprising:

a first host structure;

a second host structure;

an outer latching member comprising a composite material and having a first joining end and a first latching end, the first joining end of the outer latching member being secured to the first host structure by co-curing without fasteners and the first latching end having a plurality of latching arms extending therefrom;

an inner latching member comprising a composite material and having a second joining end and a second latching end, the second joining end of the inner latching member being secured to the second host structure by co-curing without fasteners and the second latching end having a plurality of recesses disposed thereon for accommodating the plurality of latching arms; biasing members attached to the inner latching member for biasing the plurality of latching arms toward said inner latching member; and a non-destructive releasable joint adapted to be disposed between the first joining end and the second joining end, the non-destructive releasable joint being adapted to non-destructively separate the inner latching member from the outer latching member.

* * * * *